United States Patent [19]

Sturtz

[11] Patent Number: 4,701,097

[45] Date of Patent: Oct. 20, 1987

[54] REAR PLATFORM LIFT

[75] Inventor: Charles R. Sturtz, Orlando, Fla.

[73] Assignee: FMC Corporation, Chicago, Ill.

[21] Appl. No.: 909,813

[22] Filed: Sep. 22, 1986

[51] Int. Cl.[4] ............................................. B65G 67/02
[52] U.S. Cl. ..................................... 414/495; 182/141; 187/9 E; 187/18; 254/122; 244/137.1; 414/373; 414/659
[58] Field of Search ............... 414/495, 496, 373, 917, 414/497, 592, 654, 660, 609; 182/141; 187/9 R, 9 E, 18, 8.59, 8.71, 8.72; 298/11; 254/2 R, 122; 244/137 R

[56] References Cited

U.S. PATENT DOCUMENTS

| | | | |
|---|---|---|---|
| 2,518,251 | 8/1950 | Quayle | 187/9 E |
| 3,003,746 | 10/1961 | Gridley | 187/18 X |
| 3,651,891 | 3/1972 | Pittaluga | 187/9 E |
| 3,666,127 | 5/1972 | Guyaux | 414/495 |
| 3,786,902 | 1/1974 | Ramsey | 187/9 E |
| 3,993,207 | 11/1976 | Jones | 414/495 |
| 4,476,960 | 10/1984 | Yarris | 187/9 E |
| 4,506,764 | 3/1985 | Griessenbrock et al. | 187/9 E |
| 4,627,783 | 12/1986 | DeFilippi | 414/492 X |

FOREIGN PATENT DOCUMENTS 1811245 10/1969 Fed. Rep. of Germany ...... 254/122

Primary Examiner—Frank E. Werner
Attorney, Agent, or Firm—D. W. Rudy; R. B. Megley

[57] ABSTRACT

An aircraft loader has an elevatable deck supported on scissor-type supports and urged into the elevated position by a hydraulically actuated lifting structure. The lifting structure incorporates two supports that move vertically on chain members when the cylinders are actuated.

10 Claims, 5 Drawing Figures

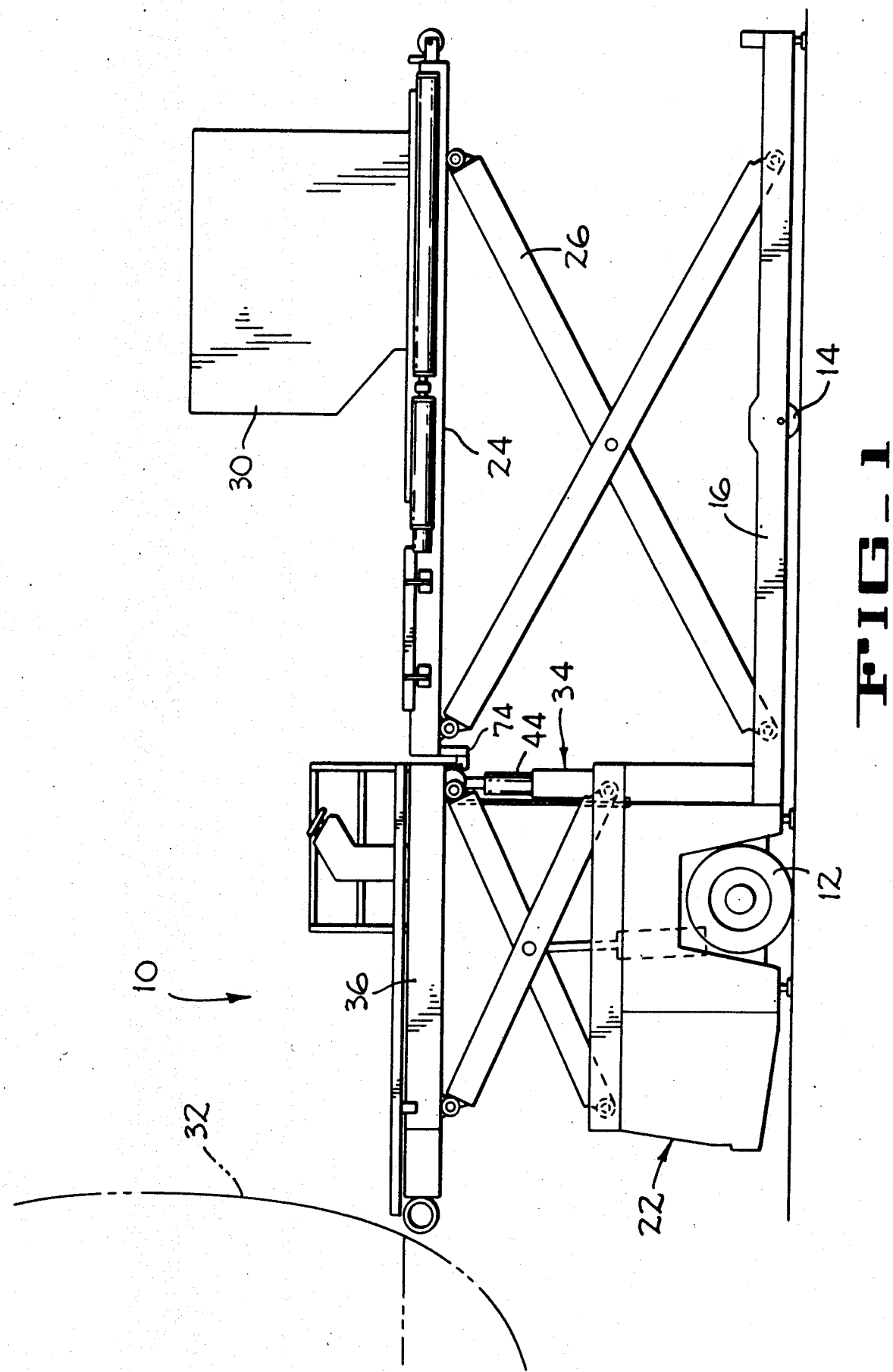

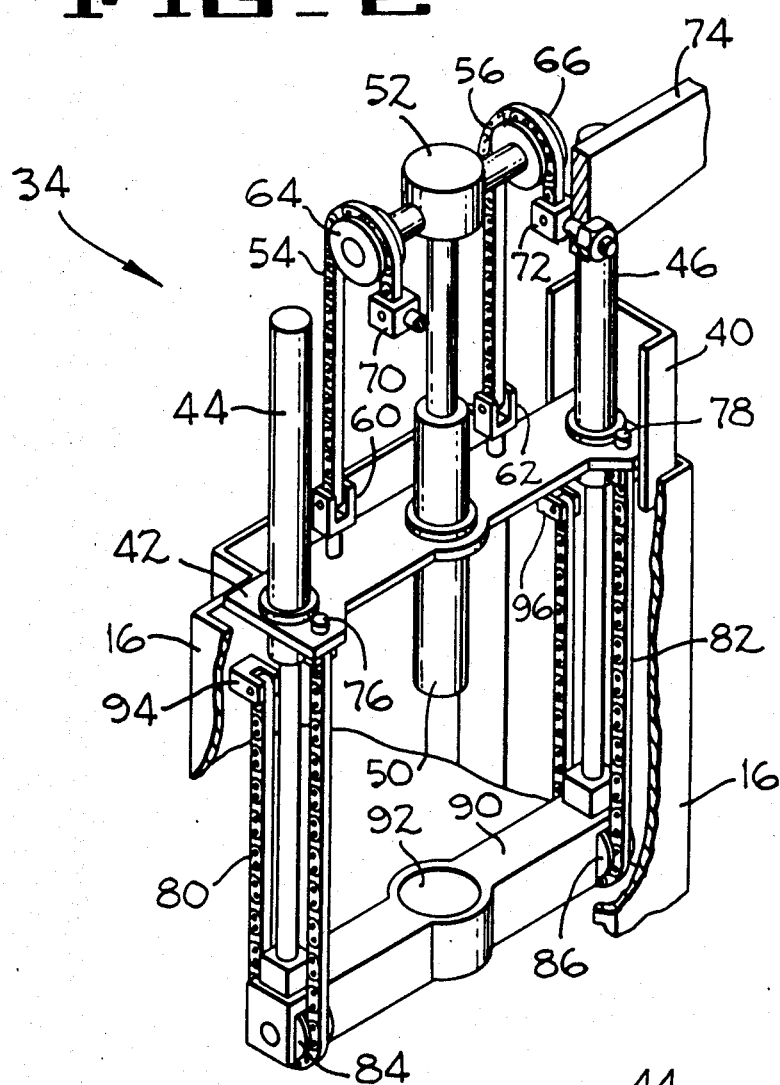
FIG_2
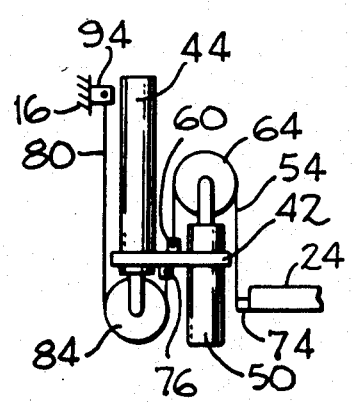
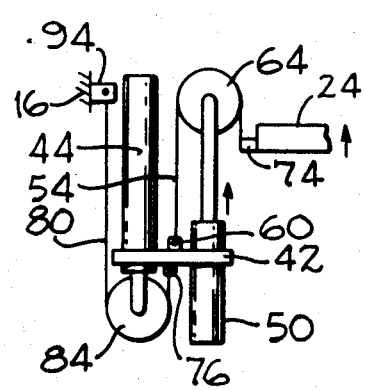
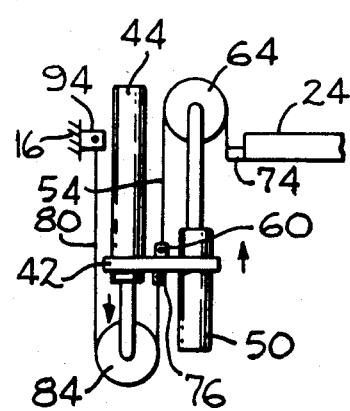
FIG_3  FIG_4  FIG_5

REAR PLATFORM LIFT

An aircraft loader is a limited purpose vehicle used to load cargo containers into aircraft. The loader must be capable of having a deck elevated from a low level position to a high position whereby a cargo container can be rolled off the loader deck into the cargo or baggage hold of the aircraft being loaded.

The airline industry flys a plethora of aircraft designs, styles and sizes. Each aircraft design requires a slightly different load height as well as having different characteristics of suspension deflection as the aircraft is being loaded. Consequently, an aircraft loader that can easily be positioned to match the height of the aircraft being loaded is a desirable apparatus. Such aircraft loaders have been in use for a number of years.

A new requirement, however, is the goal of providing a single loader that can accommodate the side delivery of cargo container requirements of various airlines. Not only are cargo containers of different widths but they also may have to be turned on the aircraft loader so that the container can be loaded into the aircraft in a manner that is specified by the particular airline.

Earlier aircraft loader designs were hampered in operation and maneuverability by the necessity of having tall upwardly extending masts about one-third of the way back from the front of the loader. These masts contained the lift actuating cylinders and attendant hardware and were impediments to loading containers as they prevented containers having a length greater than the distance between the masts from being turned "widthwise" on the loader deck prior to the container being loaded into the awaiting aircraft.

The invention herein disclosed obviates the need for such upwardly extending masts by providing a hoisting unit that remains below the deck surface when the deck surface is elevated to an aircraft loading height.

The invention will be readily understood after reading the following specification in combination with the drawing figures wherein:

FIG. 1 is a side elevation view of an aircraft loader with the load deck raised.

FIG. 2 is a detail drawing of the hydraulic lifting system of the present invention.

FIG. 3 is a schematic representation of FIG. 2.

FIG. 4 is a schematic representation of FIG. 2.

FIG. 5 ls a schematic representation of FIG. 2.

FIG. 1 shows the general environment of the invention. Presented is an aircraft loader generally 10 having ground support wheels 12 and 14 supporting a frame 16. At the front part of the vehicle an elevatable forward or deck platform 36 is supported for vertical movement above a drive train compartment generally 22 of the aircraft loader. A rear elevatable platform or deck 24 is carried on the frame 16 and supported on two sets of scissor beams 26 for movement vertically above the frame 16.

In FIG. 1 a cargo container, also referred to as cargo pallet or cargo skid, 30 is shown in a position where it is awaiting transport to the aircraft schematically shown as 32. The aspect of the aircraft loader that is the inventive contribution is represented by the hydraulic lift mechanism generally 34.

The hydraulic lift mechanism 34 is carried in the frame 16 of the aircraft loader and is designed to elevate the rear platform 24 and allow it to be lowered as necessary. It is significant that this lifting apparatus 34 does not protrude above the rear deck surface when the rear deck has been raised to meet with the forward deck 36.

While FIG. 1 shows the general environment of the lift mechanism generally 34, FIG. 2 presents the details of the structure.

In FIG. 2 the frame 16 is partially broken away to show the lift mechanism but this frame does wrap around the lifting mechanism from the left side of the figure to the right side thereof. Inside the frame 16 an extensible support 40 is carried for vertical movement in the frame 16. Although not shown in FIG. 2 there is a mirror image extensible support like 40 on the other (near) side of the lift mechanism—it has been left out of FIG. 2 for reasons of clarity. Fixedly attached to both of these extensible supports is a movable transverse support (referred to as a "second movable transverse support") which is a major component of the lift mechanism.

This second movable transverse support hosts a plurality of hydraulic rams including a matched pair of outboard hydraulic cylinders 44 and 46 mounted for vertical displacement at the outboard ends of the second transverse support 42 and a single hydraulic cylinder 50 having a rod end 52 mounted for vertical displacement in the center of the second movable transverse support 42. The pair of outboard cylinders have their cylinder portions fixedly attached to the second movable transverse support as does the single hydraulic cylinder 50.

Also fixedly attached to the second movable transverse support 42 are the grounded ends of the two first flexible support means 54 and 56 which are shown to be attached at clevises 60 and 62, respectively. These flexible support means 54 and 56 can be chains that are carried on the rod end 52 of the single hydraulic cylinder. The rod end 52 shown in a preferred embodiment may have axle mounted rollers such as 64 and 66 that accommodate the flexible support means 54 and 56. The second ends of each flexible support means are attached by retainers 70 and 72 to a frame component 74 of the rear elevator platform or deck 24.

The second movable transverse support 42 also provides a fixed anchorage for the second ends 76 and 78 of the second flexible support means 80 and 82. These second flexible support means 80 and 82 pass around individual support guide means 84 and 86 which are flanged wheel pulleys mounted for rotation around a horizontal mounting means such as an axle on the lower side of the outboard ends of a first movable transverse support 90. The first movable transverse support 90 provides a mounting location for the rod ends of the outboard cylinders 44 and 46 carried by the second movable transverse support 42. The second support 90 is also provided with a bore 92 in the central portion thereof to accommodate the single hydraulic cylinder 50 mounted to the second transverse support 42.

The first ends of the second flexible support means 94 and 96 are mounted by attachment means to the frame 16 of the aircraft loader and thus are grounded and not movable.

FIGS. 3-5 are schematic representations presented to show the various stages of elevation that are achieved by the lift mechanism as the hydraulic cylinders receive fluid from a pump source not shown but well known in the art. It should be clearly understood that these are schematic representations of the general timing that the device shown in FIG. 2 will cycle through, however, FIGS. 3-5 do not represent a preferred embodiment of the invention. Whereas FIG. 2 shows the lift device at almost full stroke, that is, almost fully extended, FIG. 3 shows the lift mechanism schematically fully retracted. The first end 94 of the second flexible support means 80 is shown grounded to frame 16. The second flexible support means 80 is carried around the support guide means 84 and then the second end of the second flexible support means 76 is attached to the second movable transverse support 42. The first movable transverse support is hidden behind the support guide means 84. Both outboard matched cylinders such as 44 are fixedly mounted to the second movable transverse support 42 as is the single hydraulic cylinder 50.

The first of a pair of the first flexible support means 54 is shown mounted at device 60 to the second movable transverse support means 42 while the other end is mounted at retainer 70 to the frame component 74.

In operation, starting at FIG. 3 and progressing to FIG. 5 the single hydraulic cylinder 50 will be pressurized causing its ram to extend with the axle mounted roller 64 lifting the frame component 74 as shown in FIG. 4. In a preferred embodiment when this single cylinder 50 is fully extended hydraulic fluid flows will be diverted the pair of outboard hydraulic cylinders 44 (and 46) causing its ram to extend and in turn lift the first movable transverse support 90 vertically upward along with the second movable transverse support 42 which will also be urged upwardly at the same time. Upon full pressurization of all the cylinders the frame component 74 and the rear deck bed will be at maximum height (now shown). As fluid is exhausted from the cylinders the rear deck bed will be gradually lowered until it is at rest on the frame 16 when theoretically all the cylinders will be raised of pressure.

An alternative embodiment would have a hydraulic circuit supply the single cylinder before the pair of outboard cylinders or vice-versa. Also the hydraulic supply could be such that all cylinders raise and lower at the same rate.

The sizing of the single cylinder 50 relative to the aggregate size of the outboard cylinders 44 and 46 will be one determining factor in the rate of lift and the timing of cylinder actuation.

Thus it can be shown that there has been provided a hydraulic lift system that enables a deck of an aircraft loader to be fully elevatable without the attendant disadvantages of the prior art. Several nuances of design may be apparent to a person skilled in the art, however, such nuances are not to be construed to in any way lessen the scope of the following claims wherein:

What is claimed is:

1. In an aircraft loader having an elevatable platform section with underlying scissor beams, an improved hydraulic lifting means comprising:

a first movable transverse support having a pair of support guide means mounted at outboard ends of said first transverse support;

a second movable transverse support having a plurality of hydraulic cylinders mounted thereto including a pair of hydraulic cylinders, each of said pair mounted for vertical displacement at outboard ends of said second transverse support, and a single hydraulic cylinder having a piston rod end mounted for vertical displacement in the center of said second movable transverse support, said pair of hydraulic cylinders having piston rod ends oppositely directed from the piston rod end of the single cylinder mounted to said first movable transverse support;

first flexible support means carried on said piston rod end of said single hydraulic cylinder of said second transverse support, said flexible support means having one end thereof fixedly connected to said second moveable transverse support and a second end of said flexible support means fixedly connected to said elevatable platform;

second flexible support means guided by said pair of support guide means of said first transverse support, said second flexible support means having one end thereof grounded to said aircraft loader and having a second end thereof fixedly mounted to said second moveable transverse support;

guide frame means carried by said aircraft loader for guiding said transverse supports as they move vertically upon actuation of said first pair and said single hydraulic cylinder.

2. The invention in accordance with claim 1 wherein said support guide means are flanged wheel pulleys mounted for rotation around a horizontal mounting means on the lower side of the outboard ends of the first movable transverse support.

3. The invention in accordance with claim 2 wherein said first movable transverse support is provided with a bore in the central portion thereof, said bore provided to accommodate said single hydraulic cylinder mounted to said second transverse support.

4. The invention in accordance with claim 3 wherein said pair of hydraulic cylinders are mounted to said second transverse support with each of said cylinders fixedly attached to said second transverse support.

5. The invention in accordance with claim 4 wherein said single hydraulic cylinder is fixedly mounted to said second transverse support.

6. The invention in accordance with claim 5 wherein said first flexible support means is a chain.

7. The invention in accordance with claim 5 wherein said first flexible support means is a pair of chains each carried on said piston rod end.

8. The invention in accordance with claim 1 wherein each of said hydraulic cylinders has a similar volumetric capacity.

9. The invention in accordance with claim 1 wherein said single hydraulic cylinder has a head end area larger than the head end area of each of said hydraulic cylinders of said pair of hydraulic cylinders.

10. The invention in accordance with claim 1 wherein the combined area of the ends of said pair of hydraulic cylinders is greater than the head end area of said single hydraulic cylinder.

* * * * *